A. M. FRINKS.
MODE OF CEILING SHIPS.
Patented Dec. 31, 1833.
7926X
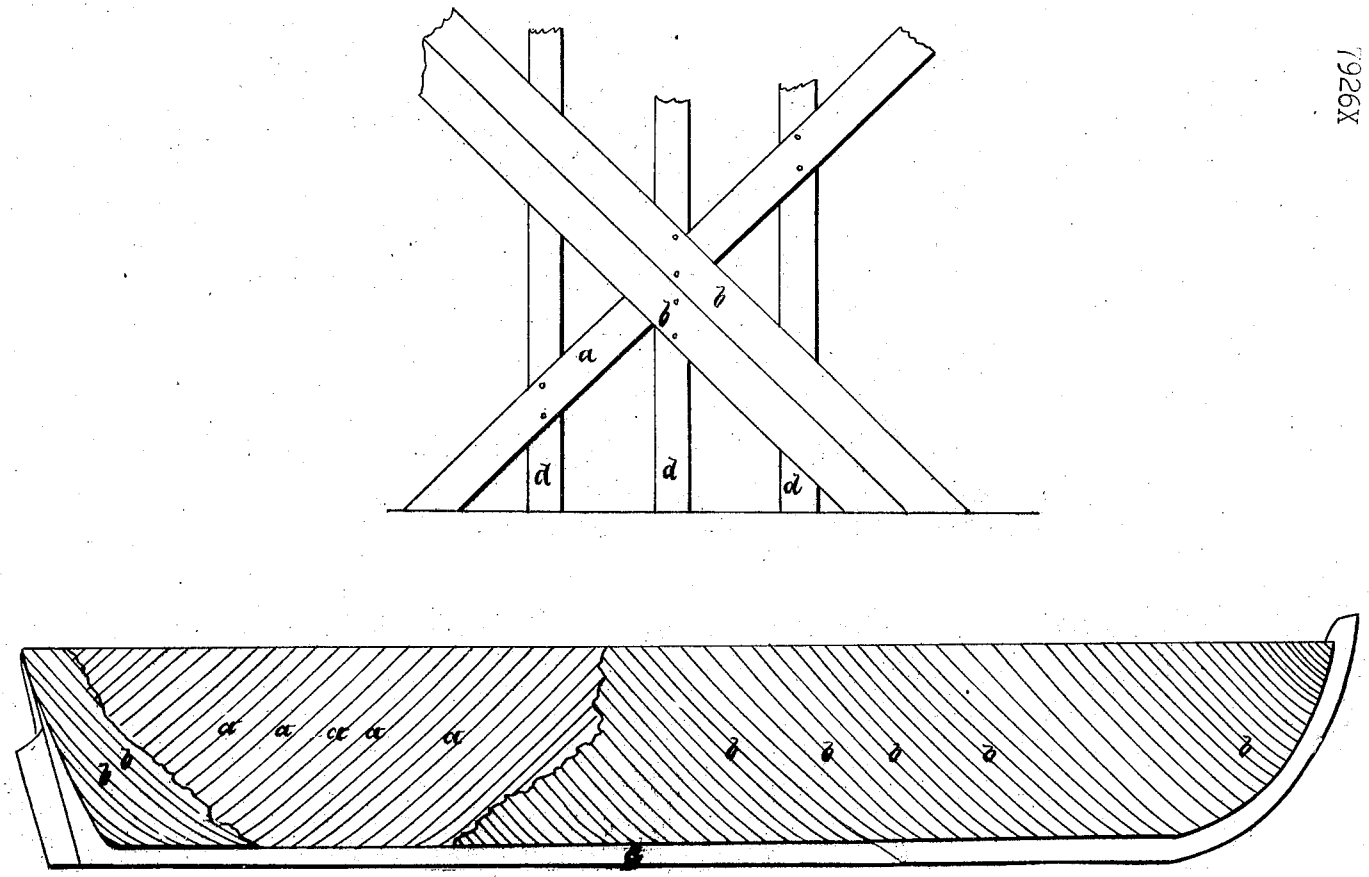

7926X

UNITED STATES PATENT OFFICE.

ANDREW M. FRINK, OF NEW LONDON, CONNECTICUT.

IMPROVEMENT IN THE MODE OF CEILING SHIPS AND OTHER VESSELS.

Specification forming part of Letters Patent dated December 31, 1833.

*To all whom it may concern:*

Be it known that I, ANDREW M. FRINK, of New London, in the State of Connecticut, have invented an Improvement in the Mode of Ceiling Ships and other Vessels, by which their strength is greatly increased without necessarily increasing the quantity of timber used in the construction; and I do hereby declare that the following is a full and exact description thereof.

The practice heretofore followed in ceiling ships or vessels has been to allow the ceiling-plank to run fore and aft of the vessel, instead of which I attach the ceiling to the timbers diagonally and use two thicknesses, making them cross each other in such angle as I may deem most convenient—as, for example, at an angle of forty-five degrees, more or less. When used between decks, I take care that the planks butt closely to the deck or other timbers at each end, as upon their so doing depends in a great degree the stiffness or stability which they communicate to the vessel. The parts which should be thus ceiled will depend upon the nature of the vessel and the uses to which she is to be put. A vessel may manifestly be so ceiled throughout or only in such parts as may be preferred.

What I claim as my invention, and for which I ask a patent, is—

The placing of the ceiling-plank of vessels diagonally, in the manner and for the purposes herein described.

A. M. FRINK.

Witnesses:
THOS. P. JONES,
M. E. A. JONES.